United States Patent
Alavi et al.

(10) Patent No.: US 9,843,352 B2
(45) Date of Patent: Dec. 12, 2017

(54) METHOD AND APPARATUS FOR DYNAMIC RADIO EMISSION COMPLIANCE MONITORING

(71) Applicant: Intel Corporation, Santa Clara, CA (US)

(72) Inventors: Hossein Alavi, Portland, OR (US); Farhana Sheikh, Portland, OR (US); Markus Dominik Mueck, Neubiberg (DE); Vladimir Ivanov, St. Petersburg (RU)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 14/379,869

(22) PCT Filed: Dec. 26, 2013

(86) PCT No.: PCT/US2013/077857
§ 371 (c)(1),
(2) Date: Aug. 20, 2014

(87) PCT Pub. No.: WO2015/099740
PCT Pub. Date: Jul. 2, 2015

(65) Prior Publication Data
US 2016/0248464 A1 Aug. 25, 2016

(51) Int. Cl.
*H04B 1/38* (2015.01)
*H04B 1/3827* (2015.01)
(Continued)

(52) U.S. Cl.
CPC ........... *H04B 1/3838* (2013.01); *H04B 15/02* (2013.01); *H04B 17/102* (2015.01); *H04W 52/44* (2013.01); *H04W 52/50* (2013.01)

(58) Field of Classification Search
USPC ................................................ 455/73, 550.1
See application file for complete search history.

(56) References Cited

U.S. PATENT DOCUMENTS

| 6,876,864 B1 * | 4/2005 | Chapin | H04B 1/406 |
| | | | 455/509 |
| 8,781,437 B2 * | 7/2014 | Ngai | H04W 52/226 |
| | | | 455/115.1 |

(Continued)

FOREIGN PATENT DOCUMENTS

| EP | 2 194 387 A1 | 6/2010 |
| WO | 2015099740 A1 | 7/2015 |

OTHER PUBLICATIONS

Cunningham, James, "EMC Requirements for Radiocommunication Transmission Apparatus", IEEE International Symposium on Electromagnetic Compatibility, Aug. 1995, 1 Page of Abstract Only.

(Continued)

*Primary Examiner* — Fayyaz Alam
(74) *Attorney, Agent, or Firm* — Alpine Technology Law Group LLC

(57) ABSTRACT

The disclosure generally relates to a method, apparatus and system for identifying non-compliant radio emissions and for enforcing compliance. In one embodiment, the disclosure relates to a dynamic radiation control of a radio by measuring a signal attribute for an outbound signal having a protocol; comparing the signal attribute with a predefined mask, the predefined mask governed by at least one of a radio location or a signal protocol; and determining whether to transmit the outbound signal.

25 Claims, 8 Drawing Sheets

(51) Int. Cl.
  *H04B 17/10*   (2015.01)
  *H04B 15/02*   (2006.01)
  *H04W 52/44*   (2009.01)
  *H04W 52/50*   (2009.01)

(56) References Cited

U.S. PATENT DOCUMENTS

| | | | |
|---|---|---|---|
| 2006/0178145 | A1 | 8/2006 | Floam et al. |
| 2007/0013547 | A1* | 1/2007 | Boaz ............... G01D 4/002 340/870.02 |
| 2010/0157910 | A1 | 6/2010 | Nentwig et al. |
| 2012/0195207 | A1* | 8/2012 | Mueck ............... H04W 24/10 370/252 |
| 2012/0207030 | A1 | 8/2012 | Luong |
| 2013/0267182 | A1* | 10/2013 | Brandt ............... H03G 3/3042 455/73 |

OTHER PUBLICATIONS

Ivanov et al., "Device, System and Method of Configuring a Radio Transceiver", PCT Patent Application No. PCT/US2013/058654, filed on Sep. 8, 2013, 52 Pages.

Ivanov et al., "Method for Certification of Reconfigurable Radio Equipment When Reconfiguration Software Developed by Third Party", U.S. Appl. No. 14/139,282, mailed on Dec. 23, 2013, 35 Pages.

Kuehn et al., "Assessment Methods for Demonstrating Compliance with Safety Limits of Wireless Devices Used in Home and Office Environments", IEEE Transactions on Electromagnetic Compatibility, vol. 49, Issue: 3, Aug. 27, 2007, 4 Pages.

International Search Report and Written Opinion for PCT Patent Application No. PCT/US2013/077857, dated Sep. 26, 2014, 17 Pages.

Staszewski et al., "RF Built-in Self Test of a Wireless Transmitter", IEEE Transactions on Circuits and Systems II: Express Briefs, vol. 54, Issue: 2, Feb. 20, 2007, 1 Page of Abstract Only.

Office Action for Taiwan Patent Application No. 103140780, dated Nov. 23, 2015, 6 pages of Taiwan Office Action and 1 page of English Search report.

International Preliminary Report on Patentability and Written Opinion for PCT Patent Application No. PCT/US2013/077857, dated Jul. 7, 2016, 13 pages.

Notice of Allowance for Taiwan Patent Application No. 103140780 dated Aug. 19, 2016, 3 pages of Notice of Allowance including 1 page of English Translation.

\* cited by examiner

METHOD AND APPARATUS FOR DYNAMIC RADIO EMISSION COMPLIANCE MONITORING

BACKGROUND

Field

The disclosure relates to a method, apparatus and system for dynamic monitoring of radio emission compliance for individual radio devices. Specifically, the disclosure relates to a method and apparatus for identifying non-compliant radio emissions and enforcement of compliance.

Description of Related Art

Radio transceivers are either static or dynamic in their transmission capability. Static radio transceivers are built or programmed by the manufacturer to operate at a known frequency spectrum and protocol. Upon manufacturing, such devices are certified by the regulatory agencies (e.g., Federal Communication Commission) for operating within regulated parameters. Regulatory certification is to ensure that no transceiver disturbs communication of other transceivers. Once certified, the operating parameters of the radio transceiver do not change and recertification is not required.

Dynamic radios—also known as field programmable radio frequency (FPRF) devices—are a class of radio frequency transceiver microchips that deliver a multi-standard, multi frequency, radio operation. An FPRF mimics the concept of a field programmable gate array (FPGA) in the RF domain to enable ad hoc programing of the RF microchip to perform at different frequencies and protocols. The key advantage of the FPRF is that the underlying device can be programmed to operate at desired frequency spectrum and under different protocols. A software defined radio (SDR) is a type of dynamic radio.

Equipment manufacturers, or third party software providers, develop new firmware versions of the FPRF and apply them to the mobile devices. The new firmware is provided via firmware over the air (FOTA) mechanisms. Once the new firmware is uploaded, the programmable radio will operate with different parameters. By law, a new regulatory certification or recertification, is required for operating the transceiver under the new parameters. However, dynamic recertification is conventionally unavailable for deployed transceivers.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
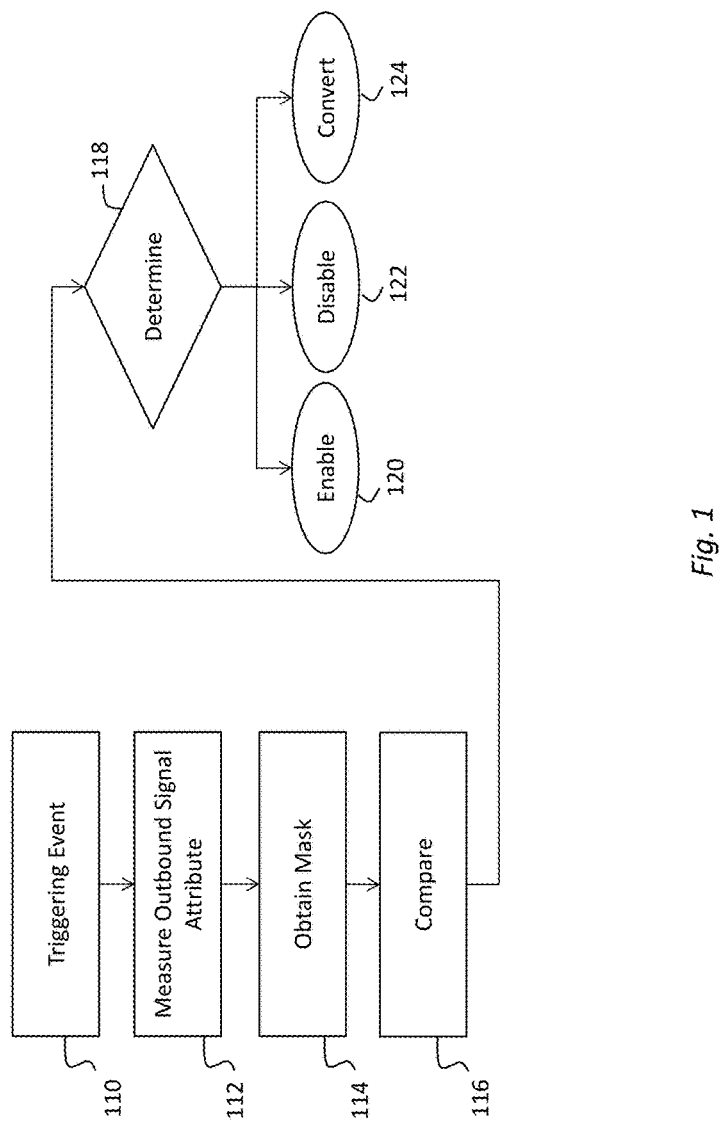
FIG. 1 is a flow diagram of an exemplary method according to one embodiment of the disclosure.

A radio transceiver produces emission energy that couples to an intended or unintended receptor. The receptor can be another transceiver. Electromagnetic interference (EMI) occurs if the received energy causes the receptor to behave in an undesired manner. Electromagnetic compatibility (EMC) is a state in which communication equipment operates reliably in a common electromagnetic environment without causing or suffering from unwanted signals. Regulatory and standards institutions set the EMI emission, susceptibility limits, and specifications of different equipment when deployed in specific environments. Before deployment, any new equipment model must go through careful emission testing and receive conformity certification from the regulatory and standard bodies. However, such pre-deployment testing does not guarantee continued conformity of the equipment throughout lifetime of a dynamic radio transceiver. Specifically, SDR or FPRPF enable dynamic reconfiguration of the radio equipment after initial certification. Such post-deployment reconfiguration must ensure continued conformity to the regulatory standards in new configurations. The pre-deployment conformance certification is not flexible to accommodate SDR. In other words, any post-deployment modification of a device's radiation behavior will render the original certificate null and void. Deployments of 3rd party field configurable radios like SDR or Cognitive Radio require entirely different techniques.

An embodiment of the disclosure overcomes the conventional regulatory inflexibility by providing a method and apparatus for dynamic and scalable recertification and/or reconfiguration of each individual device. The disclosed methodology provides dynamic EMI monitoring and ensures global conformity to regulatory standards. In an exemplary implementation, a regulatory emission watch guard (REWG) block is embedded in, or added to, each configurable radio. The REWG block may be embedded or integrated with the radio to enforce compliance. In another embodiment, the REWG can be onboard the configurable radio.

The REWG monitors device radiation spectrum and authorizes continued device transmission in compliance with the regulatory requirements. The REWG block may be certified by the appropriate regulatory agency and securely embedded in the device so as to prevent tampering or disabling. The REWG block may also communicate with external resources such as a cloud-based dynamic monitoring server to obtain up-to-date regulatory specifications. The communication can be encrypted and transparent to the underlying device or its operator. In an alternative embodiment, the regulatory specification can be stored locally and immediately accessible to the REWG block.

An REWG's operation can be triggered after a triggering event or periodically. Some examples of triggering events include: boot up, configuration modification, software (FPRF) upgrade, first time use of a communication mode, mandated periodic maintenance, or the like. Alternatively, the REWG can be programmed to trigger periodically. For example, an REWG can be configured to test device EMI every few days or on recurring calendar dates. During an exemplary testing, the REWG measures a set of radiation parameters and determines EMI compliance. Exemplary radiation parameters may include: full radiation power spectrum (amplitudes at different radio frequencies or amplitude at randomly selected or specific frequencies). Transceiver output power may also be monitored. Transmit and receive frequency bands may also be monitored as each band is regulated through standards and regulatory bodies.

Once the radiation parameters are obtained, the REWG can compare the parameters with predefined regulatory criteria. If the EMI complies with the regulatory criteria, device signal transmission remains enabled. If the EMI does not comply with the regulatory criteria, the REWG may decide to (1) disable non-compliant signal transmission, (2) manipulate the signal to compliance (e.g., attenuate), or (3) take other appropriate compliance and reporting steps.

Determining whether a signal transmission is EMI-compliant can be a function of the signal's parameters (interchangeably, attributes), the location of transmission, the communication protocol and other regulatory requirements. By way of example, EMI compliance may be determined by comparing a signal's power spectrum with a regulatory power spectrum mask. In this manner, the REWG is configured to compare the signal's power spectrum with a known regulatory mask as a function of the signal's location and protocol. If the signal spectrum exceeds the regulatory mask, non-compliance EMI determination can be made.

The comparison and determination steps may be implemented remotely or locally. In the remote implementation, the REWG obtains and transmits the signal's power spectrum to a regulatory cloud server. The cloud server compares the signal's power spectrum with the predefined regulatory mask. A compliant radio receives an operation authorization response from the cloud signaling the REWG to allow the radio to enable (or continue) transmission. For a non-compliant radio, the regulatory cloud directs the REWG to disable transmission or optionally switch the device to a default compliant mode.

The comparison or determination steps may also be implemented locally. Here, the REWG is provided with a database containing the regulatory masks. The REWG block then retrieves the appropriate regulatory mask (e.g., as a function of location and protocol). The REWG block then makes the determination of whether the signal complies with the regulatory emission requirements. The REWG may report out its determination and decision. The regulatory database may be periodically updated to contain the appropriate masks.

In still another embodiment, one of the comparison or determination step is implemented locally and the other remotely. For example, the REWG block may receive signal compliance results from a remote server and make its own determination whether to allow signal transmission. Alternatively, the REWG block my conduct EMI comparison and report its finding to a remote server. The remote server then decides whether the REWG may enable or disable signal transmission and the decision is transmitted to the REWG block.

FIG. 1 is a flow diagram of an exemplary method according to one embodiment of the disclosure. At step 110, a triggering event causes the radio to measure one or more attributes of an outbound signal. The triggering event may be part of a periodic signal level check. An internal or external event may also define a triggering event. For example, a change in the outbound signal's protocol, transmission power, location or any combination thereof may define a triggering event. Other triggering events include: boot up, configuration modification, software (FPRF) upgrade, first time use of a communication mode, mandated periodic maintenance, or the like.

Once triggered, one or more signal attributes of the outbound signal is measured at step 112. Measuring the outbound signal attribute may include sampling the outbound signal at a plurality of frequencies to determine the signal's power spectrum. The outbound signal attributes may include signal power, amplitude, frequency or any other measurable signal property, such as, 3 dB bandwidth, adjacent channel leakage, amplitude at randomly selected or specific frequencies.

At step 114, a predefined mask is obtained. The predefined mask may be configured as a function of signal location, protocol, interference criteria or a combination thereof. The predefined mask may be devised by a regulatory agency, a governing organization or a private entity appointed to monitor radio emission. In an exemplary embodiment, the predefined mask defines a radiation mask configured by a governing organization to eliminate EMI. The predefined mask may be stored locally or at an external server. If stored external to the dynamic radio, the mask can be either transmitted to the radio for the subsequent steps or the subsequent steps may be performed external to the radio.

At step 116, comparison is made between the measured signal attributes (step 112) and the predefined mask (step 114). In an exemplary embodiment, comparison is made on the basis of the power spectrum of the outbound signal. Here, the outbound signal is sampled at a sampling rate to obtain signal power data as a function of outbound signal power and frequency.

At step 118, determination is made as to whether the outbound signal should be transmitted. The determination can be made by comparing one or more signal attributes with a predefined mask. For example, the outbound signal may be sampled to obtain a signal power spectrum. The signal power spectrum can then be compared with a predefined mask which identifies signal power limits for the given frequency. If the signal power spectrum does not exceed the predefined mask, at step 120, the signal is enabled. If the signal power spectrum exceeds the mask, at step 122, outbound transmission is disabled. Alternatively, if the signal power spectrum exceeds the predefined mask, the outbound signal may still be transmitted once it is converted or manipulated to a power spectrum that does not exceed the mask. This is shown at step 124. Such conversion may include attenuation of the outbound signal to a lower transmission power or to a different protocol.

The steps shown in FIG. 1 may be implemented entirely at the radio (or the REWG part of the radio) or they may be performed partly at the radio and partly at a remote server. For example, steps 110 and 112 may be performed at the radio to generate the outbound signal's attribute(s). The attribute(s) can be sent out to a remote server and steps 114, 116 and 118 to be performed at the remote server. In an alternative embodiment, the resulting determination (step 118) can be communicated with the radio where one of steps 120, 122 or 124 is implemented.

Figure 2:
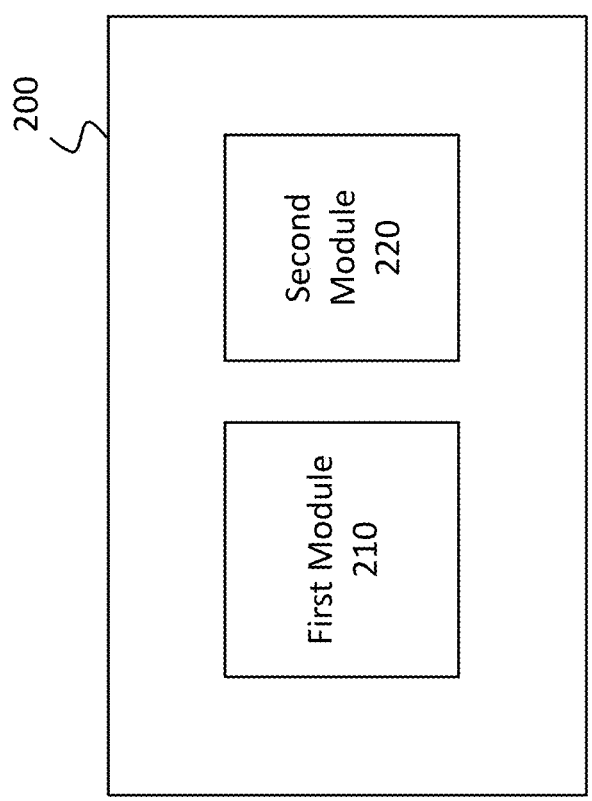
FIG. 2 schematically illustrates an exemplary device for implementing an embodiment of the disclosure.

FIG. 2 schematically illustrates an exemplary device for implementing an embodiment of the disclosure. Specifically, FIG. 2 shows device 200 which can be an integral part of a larger system or can be a stand-alone unit. Device 200 may define an REWG. For example, device 200 can define a system on chip configured to implement the disclosed methods. Device 200 may also be part of a larger system having multiple antennas, a radio and a memory system. Device 200 is shown with first module 210 and second module 220. Modules 210 and 220 can be hardware, software or a combination of hardware and software. Further, each of module 210 and 220 can define one or two independent processor circuits. In an exemplary embodiment, at least one of modules 210 or 220 includes a processor circuit and a memory circuit (not shown) to communicate with each other. In another embodiment, the modules 210 and 220 define different parts of the same data processing circuit. While not shown, other discrete or independent modules may be added to implement the embodiments disclosed herein.

Device 200 may be interposed between the programmable radio and an antenna to receive the outbound signal from the radio prior to transmission through antenna. In an exemplary embodiment, first module 210 samples the outbound signal and, if triggered, measures one or more attributes of the outbound signal. The measurement may be carried out over time to accumulate radiation parameter statistics over time and upon trigger event, conduct comparisons, compliance determination and enforcement. First module 210 may also determine the outbound signal protocol and location so as to identify an appropriate predefined regulatory mask. Second module 220 may compare the outbound signal attribute with the predefined mask and determine whether to continue enablement of transmission to the antenna (not shown). Additional modules (not shown) may be included, for example, to contain a database of predefined mask, to determine outbound signal location and/or protocol and to communicate the measured attributes to an external server. By way of example, an additional module (not shown) may be included to determine whether to trigger operation of device 200.

Figure 3:
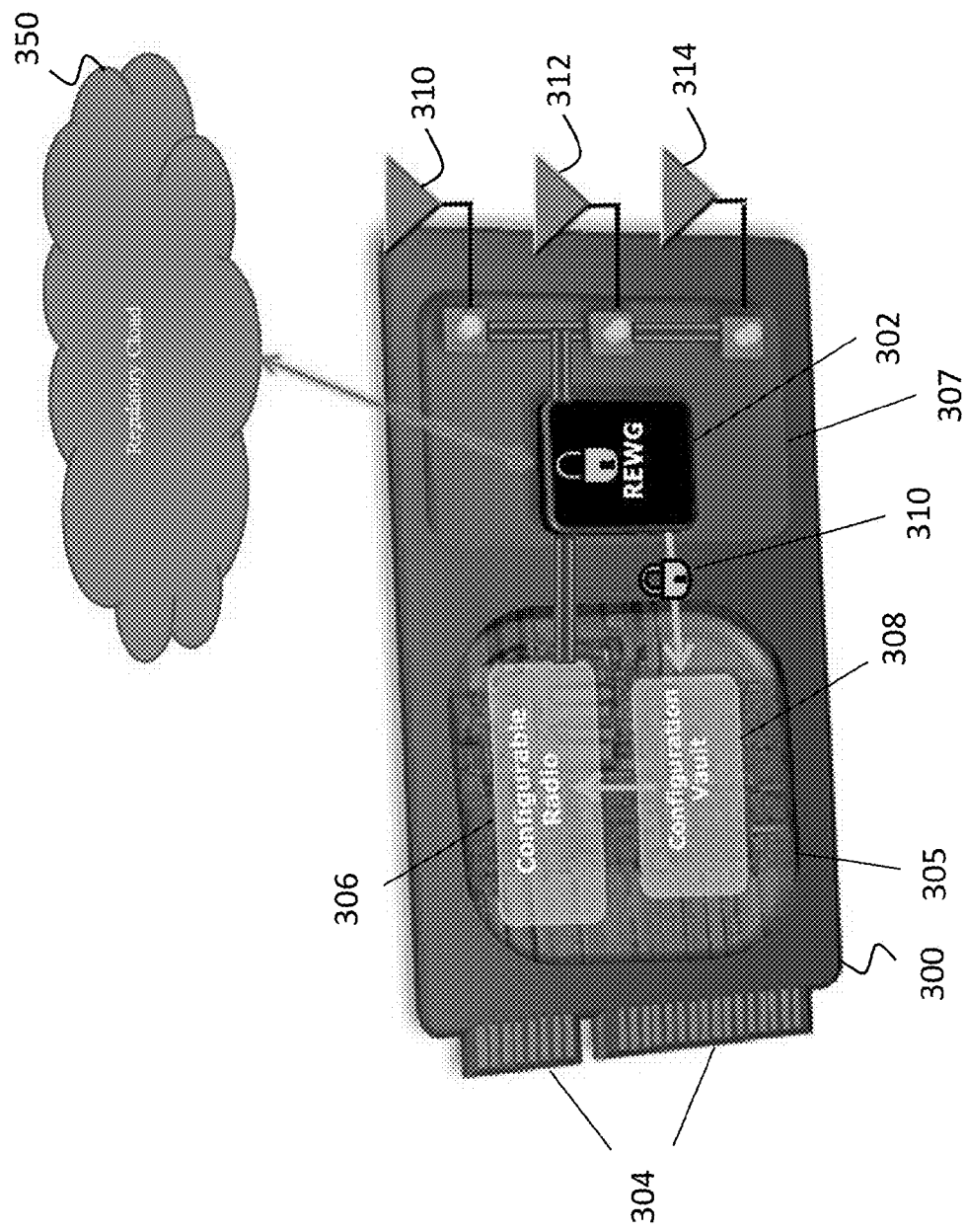
FIG. 3 shows an exemplary system according to one embodiment of the disclosure.

FIG. 3 shows an exemplary system according to one embodiment of the disclosure. System 300 includes connectors 304, digital block 305, digital/RF block 307 and antennas 310, 312 and 314. Digital block 305 includes programmable (configurable) radio 306 and encrypted configuration vault or memory 308. Digital/RF block 307 includes REWG 302. Blocks 305 and 307 communicate through secured interface 310. Interface 310 may provide encrypted interface between configuration vault 305 and REWG 302. Connectors 304 connect system 300 to other units such as a mother board or a display device. Antennas 310, 312 and 314 enable encrypted wireless communication with cloud 350. While FIG. 3 shows regulatory cloud 350, it is noted that the disclosed principles are not limited thereto and system 300 may be entirely autonomous or communicate with the regulatory server by wired communication means.

Configurable radio 306 can be any radio device capable of remote programming. For example, configurable radio 306 may be an SDR. To this end, Configurable radio 306 may include a separate module, software or firmware. Configuration vault (memory) 308 may be integrated with the configurable radio 306 or with REWG 302. Alternatively, configuration vault 308 may define an integrated module. In an exemplary embodiment, configuration vault 305 comprises transmitter control and/or configuration database. In another embodiment, configuration vault 308 can be locked or programmed by REWG 302 via encrypted interface 310.

REWG 302 may be approved or certified by a participating regulatory agency before it is embedded in various configurable radios. REWG 302 can also be embedded and/or installed in pair with configurable radio 306. REWG 302 can also be configured to measure key radiation parameters as well as the outbound signal location. For example, REWG 302 may include a geo-positioning system (GPS) to provide device regulatory region. REWG 302 disables/enables transmission of outbound signal generated by configurable radio 306. In one embodiment, REWG 302 may program the outbound signal so that the signal complies with regulatory requirements. In another embodiment, REWG 302 can be equipped with encrypted cloud link with participating regulatory bodies' exclusive keys. The encryption scheme can be standardized consistent with the regulatory requirements.

Regulatory cloud 350 may comprise one or more local regulatory servers (LRS) controlled by the regulatory body in each participating region. Each LRS will have a dedicated encryption key such that REWG 302 and LRS 350 can maintain secure communication. In one embodiment, a table of participating communication protocols and geographic boundaries for each protocol is stored in REWG 302.

In one implementation the REWG block is certified by the local regulatory agency prior to deployment. The certification may be consistent with the certification requirements for static radios. Upon certification, regulatory credentials may be assigned to the REWG based on criteria including measurement capabilities and reliability, communication security, and tampering probability. Configurable radios containing a certified REWG may not require further certification after the REWG block is deployed.

Figure 4:
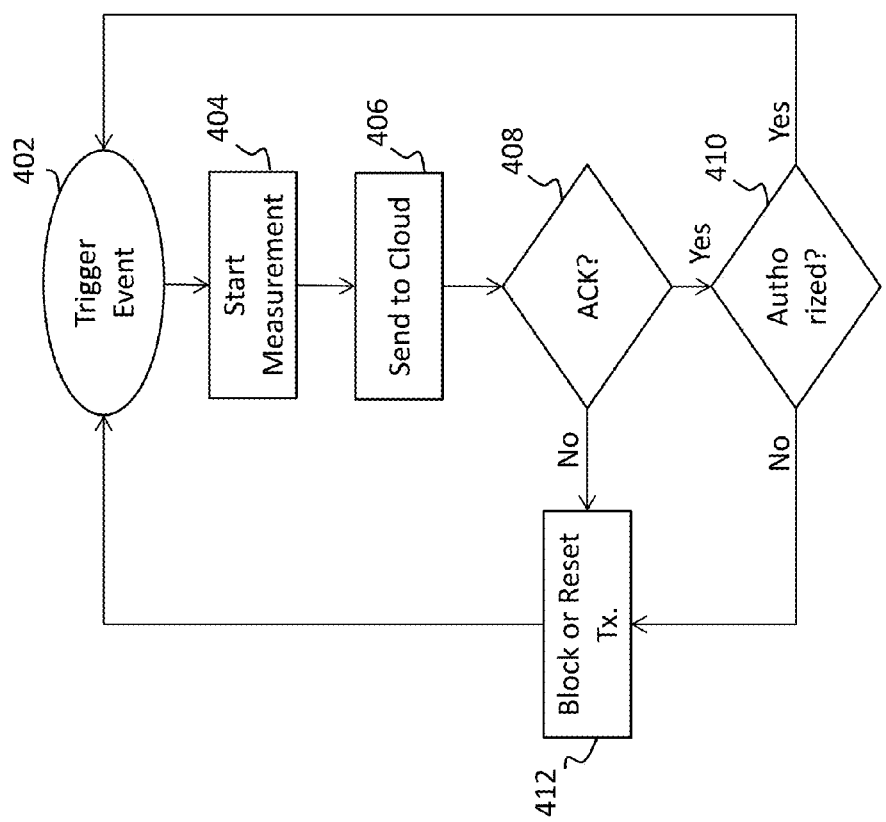
FIG. 4 is a flow diagram of an exemplary cloud-based regulatory implementation.

FIG. 4 is a flow diagram of an exemplary cloud-based regulatory implementation. While the REWG may continually measure key attributes such as radiation parameters or other parameters identified by the local regulatory requirements, the exemplary process of FIG. 4 starts at step 402 when a triggering event causes the REWG to start measuring signal attributed (step 404). At step 406, the REWG send its regulatory credentials, its location and the measured signal attributes to the LRS in the cloud. The communication between REWG and LRS may be encrypted. At step 408 the LRS acknowledges receipt of the data from REWG with an enable/disable command. The LRS decides on whether to allow transmission of the outbound signal by comparing the measured signal attributes with the predefined mask determined for the signal location.

At optional step 412, if the acknowledgment command is not received within several attempts to reach the LRS (or if the LRS is non-responsive), the REWG may prompt the radio to use an unlicensed mode (e.g., Wi-Fi) designated by the regulatory agency, down-convert the signal to a default transmission mode or block the transmission. At steps 410 the REWG executes LRS's command. If the outbound signal transmission is authorized, REWG enables transmission and awaits the next triggering event. If the outbound signal transmission is not authorized, the REWG may exercise the options of blocking the transmission or resetting transmission to a default mode as shown in step 412.

Figure 5:
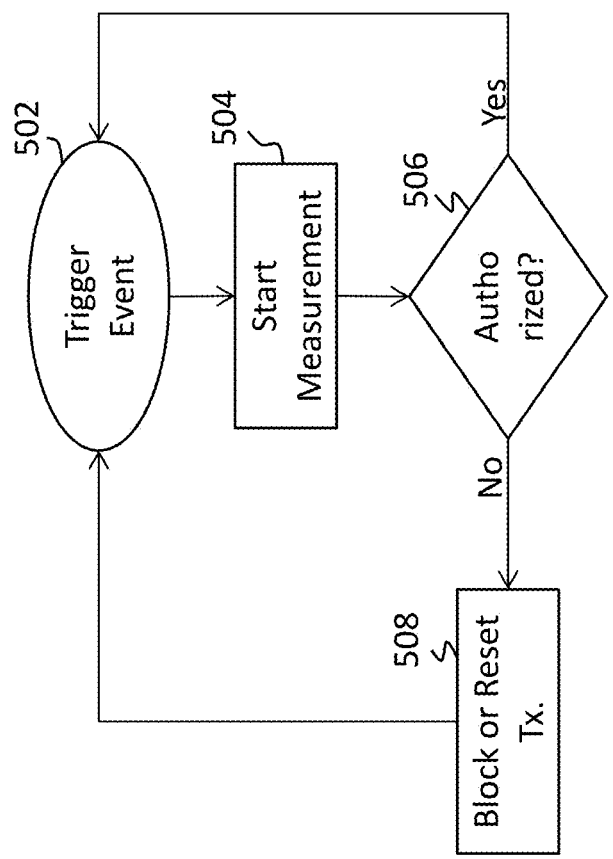
FIG. 5 is a flow diagram of an exemplary self-regulation implementation.

FIG. 5 is a flow diagram of an exemplary self-regulating implementation. In the embodiment of FIG. 5, the triggering event occurs at step 502. At step 504, the REWG makes statistical measurements of the outbound signal's desired attributes. In this implementation, a database of the regulatory requirements for various geo-locations are statically programmed or dynamically uploaded into the REWG. Thus, the REWG module is programmed to enable or disable transmissions based on the regulatory enforcement policy. The policy may be self-contained in the form of a locally-accessible encrypted database. At step 506. the REWG compares the attribute measurements with the predefined mask and decides whether to enable/disable the outbound signal. If enabled, the signal is transmitted and the REWG awaits the next triggering event. If disabled, the outbound signal is either blocked or converted to an acceptable signal prior to transmission as shown at step 508.

Figure 6:
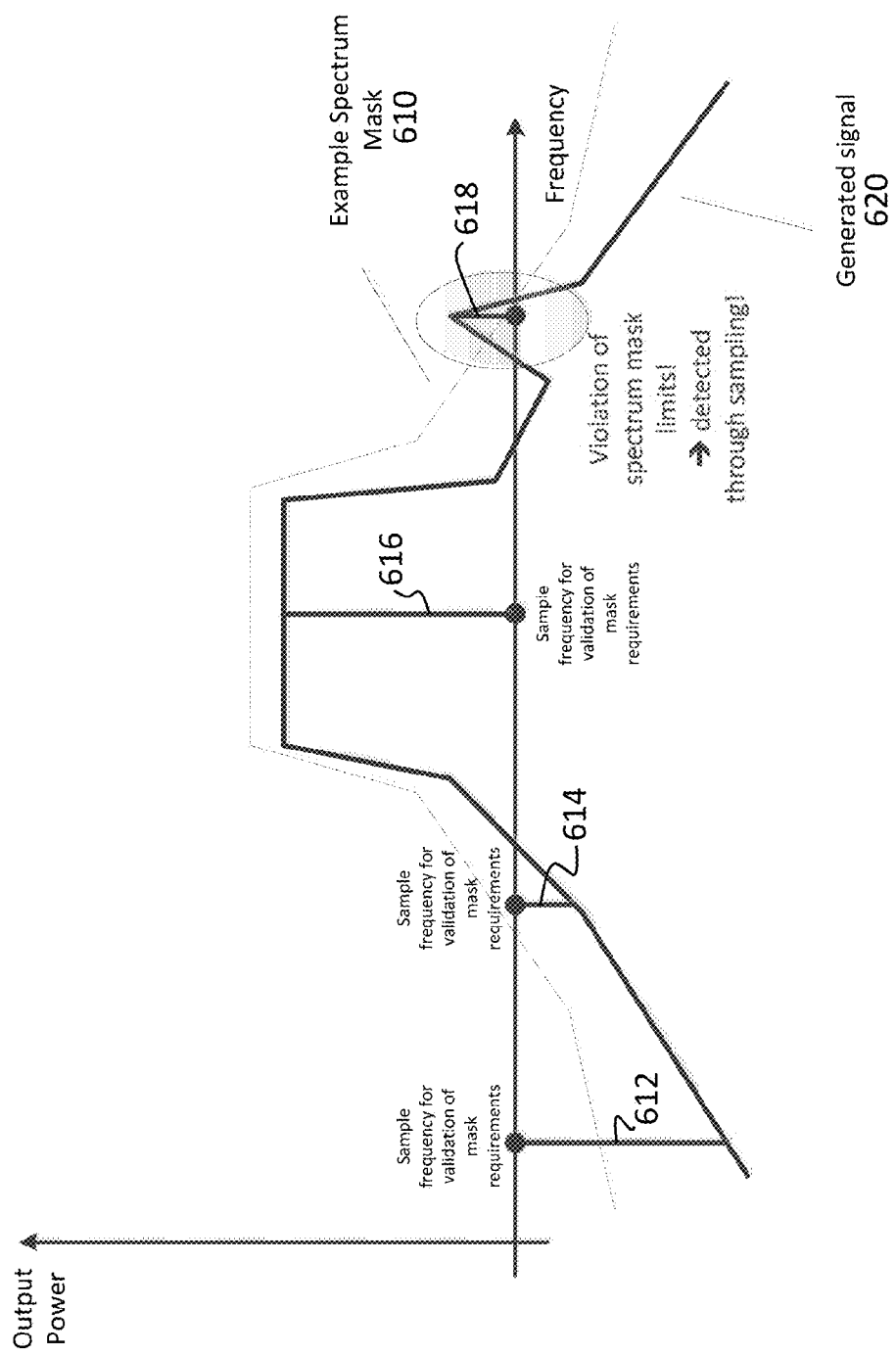
FIG. 6 schematically illustrates a disabled outbound signal.

FIG. 6 schematically illustrates a disabled outbound signal. Specifically, FIG. 6 shows signal power spectrum having the signal frequency as the horizontal axes and the signal output power as the vertical axis. Power spectrum mask 610 can be defined by the regulatory agency as a function of—among others—signal location, power and protocol. Generated signal 620 is composed of samplings 612, 614, 616 and 618. The verification points of the mask can be constant at each checkpoint. The frequency sampling points may be selected randomly at each checkpoint or some of the frequency points may be predefined while others may be selected randomly. Such random selection may be performed independently over subsets of the target spectrum such that there are frequency samples in each subset. When generated signal 620 is transposed on the same power spectrum as spectrum mask 610, it is apparent that at sampling point 618, the signal output power exceeds the mask's limit. Accordingly, the spectrum mask is deemed as exceeded and the signal is disabled.

Figure 7:
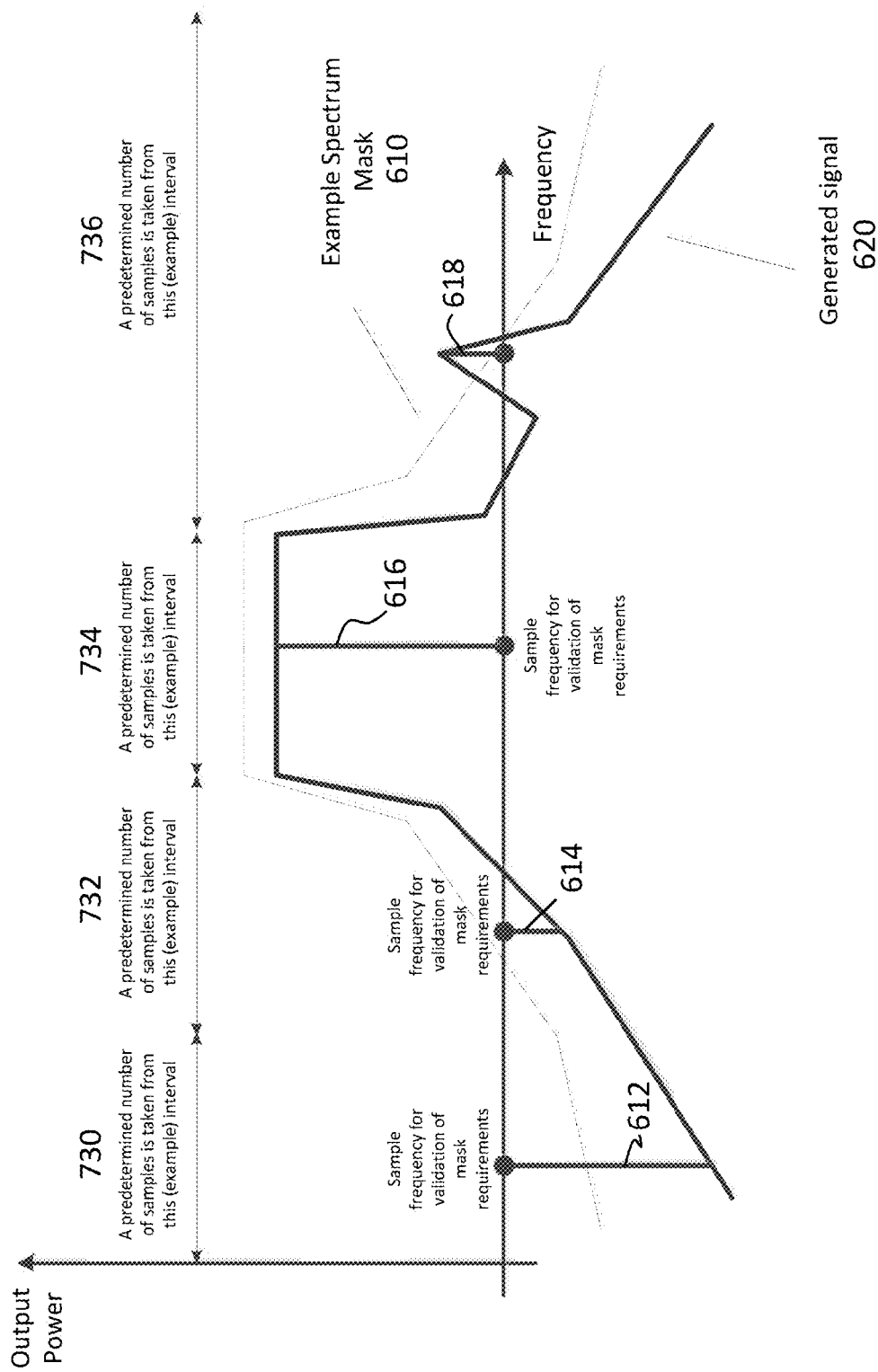
FIG. 7 schematically illustrates an enabled outbound signal.

FIG. 7 schematically illustrates an enabled outbound signal. FIG. 7 also shows an embodiment of the disclosure where predetermined sample points are identified in each interval. Specifically, FIG. 7 shows portions 730, 732, 734 and 736 were a predetermined number of samples are taken the exemplary outbound signal 620. It should be noted that each of sampling points samples 612, 614, 616 and 618 are exemplary. Each of segments 730, 732, 734 and 736 may be sampled multiple times.

Figure 8:
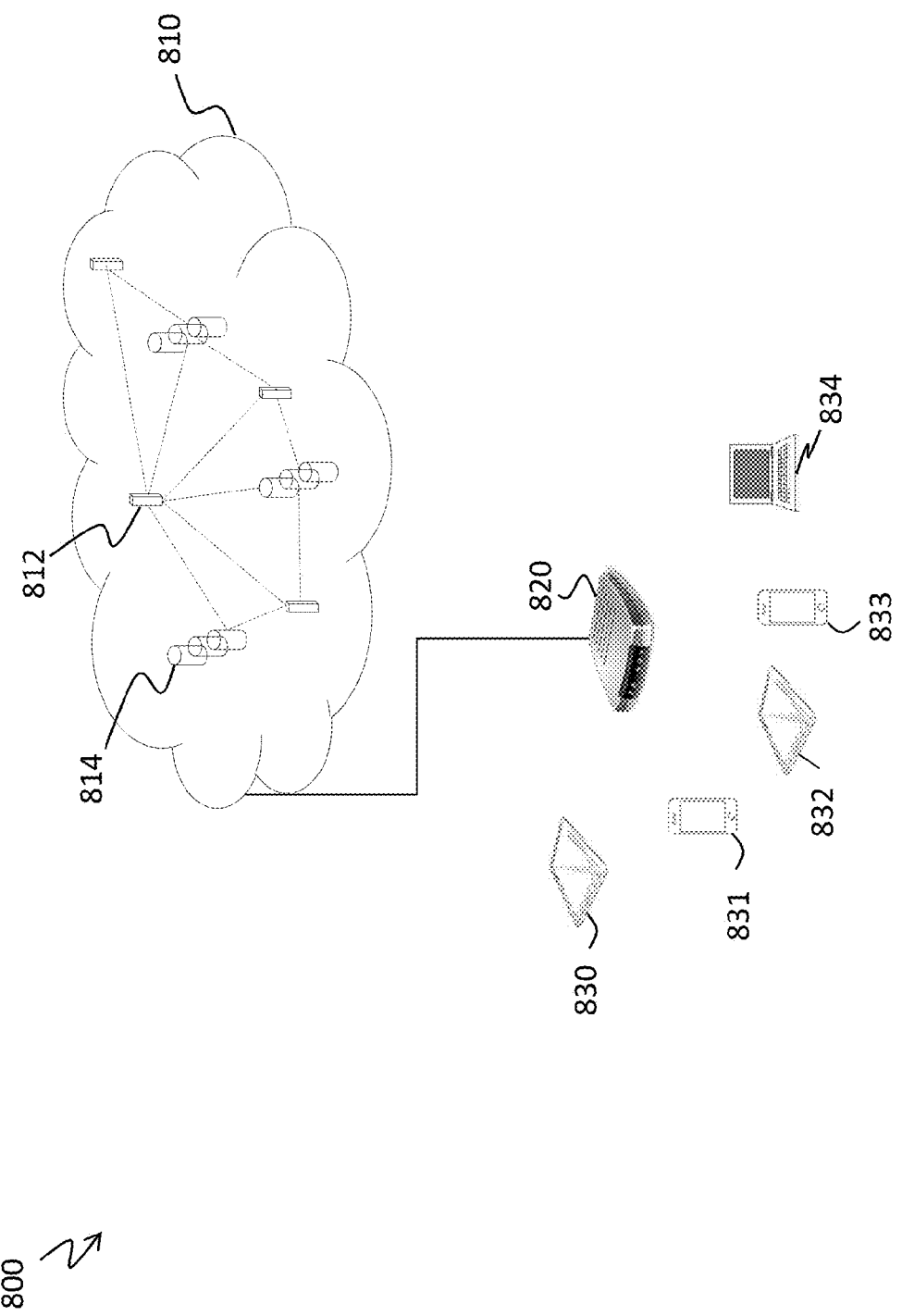
FIG. 8 is a schematic representation of a network for implementing the disclosed principals.

FIG. 8 is a schematic representation of a network for implementing the disclosed principals. Environment 800 includes access point (AP) 820 which relays communication between cloud network 810 to wireless stations (STAs) 830, 831, 832, 833 and 834. For illustrative purposes, STAs include smartphones, laptops and tablets or any other device capable of radio communication. Each STA includes a programmable radio or an SDR. AP 820 can be one of multiple APs serving environment 800.

In one embodiment, the STAs receive routine signals from AP 820. The signal may be relayed from cloud regulatory server 812. The routine signal may include a triggering event for the STA or it may provide other information to the STA. The communication between regulatory cloud 810 and the STAs can be encrypted. An STA may, on its own initiative (triggering), communicate certain regulatory information to regulatory cloud 810. The transmitted information may include measurements of an outbound signal's attributes, the signal's protocol and the STA's location. Depending on the exchange protocol between the STA and regulatory cloud 810, regulatory server 812 may retrieve a predefined regulatory mask appropriate for STA's location and protocol. The regulatory mask may be stored at database 814, compare the statistical signal information with the mask and respond to the STA with enable/disable/change command. In an alternative embodiment, regulatory server 812 may identify the appropriate mask from database 814 and transmit the mask to the STA for comparison and determination of the enable/disable/change command. The STA will then perform the enable/disable command onsite.

The following examples pertain to further embodiments of the disclosure. Example 1 includes a method for dynamic radiation compliance control of a radio, the method comprising: measuring a signal attribute for an outbound signal having a first protocol; comparing the signal attribute with a regulatory mask, the regulatory mask governed by at least one of a radio location or a signal protocol; and determining whether to transmit the outbound signal.

Example 2 includes the method of example 1, wherein the radio comprises of a software programmable radio or a dynamically-configurable radio system.

Example 3 includes the method of example 1 or 2, wherein measuring the signal attribute further comprises determining a power spectrum for the outbound signal.

Example 4 includes the method of example 1 or 2, further comprising defining the regulatory mask as a function of at least one of the radio location and a protocol associated with the outbound signal.

Example 5 includes the method of example 1 or 2, wherein determining whether to transmit the outbound signal further comprises transmitting the outbound signal if the signal attribute does not exceed the regulatory mask.

Example 6 includes the method of example 1 or 2, further comprising attenuating the signal prior to transmission if the signal attribute exceeds the regulatory mask.

Example 7 includes the method of any of examples 1, 2 or 6, wherein the signal attribute defines a power spectrum and the regulatory mask defines a power spectrum mask.

Example 8 includes the method of any of examples 1 or 2, further comprising manipulating the outbound signal to comply with a default spectrum mask.

Example 9 includes the method of example 1, wherein comparing the signal attribute with a regulatory mask further comprises transmitting the signal attribute to an external server.

Example 10 includes a device comprising: a first module configured to sample an outbound signal from a programmable radio, the outbound signal having a first protocol; a second module configured to determine whether a signal attribute of the outbound signal exceeds a regulatory mask, the regulatory mask governed by at least one of a geography or a protocol associated with the outbound signal.

Example 11 includes the device of example 10, wherein the programmable radio comprises a software programmable radio or a dynamically-configurable radio system.

Example 12 includes the device of example 10, wherein the first module is configured to measure an attribute of the outbound signal.

Example 13 includes the device of example 12, wherein the signal attribute defines a signal power spectrum.

Example 14 includes the device of example 10, wherein the second module is configured to prevent outbound signal transmission if the signal attribute exceeds the regulatory mask.

Example 15 includes the device of example 10, wherein the second module is configured to enable the outbound signal transmission if the outbound signal does not exceed the regulatory mask.

Example 16 includes the device of example 10, wherein the second module is further configured to transmit the outbound signal with an attenuated signal if the single attribute exceeds the regulatory mask.

Example 17 includes the device of any of examples 14-16, wherein the regulatory mask defines a signal power spectrum devised as a function of a signal protocol and a transmission location.

Example 18 is directed to a system comprising: a programmable radio to generate an outbound signal; a first module configured to sample the outbound signal from a programmable radio, the outbound signal having a first protocol; a second module configured to determine whether a signal attribute of the outbound signal exceeds a regulatory mask, the regulatory mask governed by at least one of a geography or a protocol associated with the outbound signal; an antenna for transmitting the outbound signal.

Example 19 includes the system of example 18 or 19, wherein the second module is configured to prevent outbound signal transmission if the signal attribute exceeds the regulatory mask.

Example 20 includes the system of example 18 or 19, wherein the second module is configured to enable the outbound signal transmission if the outbound signal does not exceed the regulatory mask.

Example 21 includes the system of example 18 or 19, wherein the second module is further configured to enable transmission of the outbound signal with an attenuated signal if the single attribute exceeds the regulatory mask.

Example 22 includes a computer-readable storage device containing a set of instructions to cause a computer to perform a process comprising measuring a signal attribute of an outbound signal having a first protocol; comparing the signal attribute with a regulatory mask, the regulatory mask governed by at least one of a radio location or a signal protocol; and determining whether to transmit the outbound signal.

Example 23 includes the computer-readable storage device of example 22, wherein the instructions further comprises defining the regulatory mask as a function of at least one of a location and a protocol associated with the outbound signal.

Example 24 includes the computer-readable storage device of example 22, wherein determining whether to transmit the outbound signal further comprises transmitting the outbound signal if the signal attribute does not exceed the regulatory mask.

Example 25 includes the computer-readable storage device of example 22, further comprising transmitting the outbound signal with a default protocol if the signal attribute exceeds the regulatory mask.

While the principles of the disclosure have been illustrated in relation to the exemplary embodiments shown herein, the principles of the disclosure are not limited thereto and include any modification, variation or permutation thereof.

What is claimed is:

1. A method for dynamic radiation compliance control of a field-programmable radio, the method comprising: receiving a triggering event:
   in response to the triggering event, measuring a signal attribute for an outbound signal having a first protocol;
   comparing the signal attribute with a regulatory mask, the regulatory mask governed by at least one of a radio location or a signal protocol; and determining whether to transmit the outbound signal
   wherein the regulatory mask is received by the field-programmable radio from an external source prior to comparing the signal attribute with the regulatory mask.

2. The method of claim 1, wherein the radio comprises one of a software programmable radio or a dynamically-configurable radio system.

3. The method of claim 1, wherein measuring the signal attribute further comprises determining a power spectrum for the outbound signal.

4. The method of claim 1, further comprising defining the regulatory mask as a function of at least one of the radio location and a protocol associated with the outbound signal.

5. The method of claim 1, wherein determining whether to transmit the outbound signal further comprises transmitting the outbound signal if the signal attribute does not exceed the regulatory mask.

6. The method of claim 1, further comprising attenuating the signal prior to transmission if the signal attribute exceeds the regulatory mask.

7. The method of any of claim 6, wherein the signal attribute defines a power spectrum and the regulatory mask defines a power spectrum mask.

8. The method of claim 1, further comprising manipulating the outbound signal to comply with a default spectrum mask.

9. The method of claim 1, wherein comparing the signal attribute with a regulatory mask further comprises transmitting the signal attribute to an external server.

10. A device comprising:
    a first module configured to sample an outbound signal from a programmable radio, the outbound signal having a first protocol;
    a second module configured to determine whether a signal attribute of the outbound signal exceeds a regulatory mask, the regulatory mask governed by at least one of a geography or a protocol associated with the outbound signal; wherein the regulatory mask is received by the programmable radio from an external source prior to comparing the signal attribute with the regulatory mask: wherein one of the second module is further configured to one of end signal propagation or adjust the signal attribute if the signal attribute exceeds the regulatory mask.

11. The device of claim 10, wherein the programmable radio comprises a software programmable radio or a dynamically-configurable radio system.

12. The device of claim 10, wherein the first module is configured to measure an attribute of the outbound signal.

13. The device of claim 12, wherein the signal attribute defines a signal power spectrum.

14. The device of claim 10, wherein the second module is configured to prevent outbound signal transmission if the signal attribute exceeds the regulatory mask.

15. The device of claim 10, wherein the second module is configured to enable the outbound signal transmission if the outbound signal does not exceed the regulatory mask.

16. The device of claim 10, wherein the second module is further configured to transmit the outbound signal with an attenuated signal if the single attribute exceeds the regulatory mask.

17. The device of claim 16, wherein the regulatory mask defines a signal power spectrum devised as a function of a signal protocol and a transmission location.

18. A system comprising:
    a programmable radio to generate an outbound signal;
    a first module configured to sample the outbound signal from the programmable radio, the outbound signal having a first protocol; a second module configured to determine whether a signal attribute of the outbound signal exceeds a regulatory mask, the regulatory mask governed by at least one of a geography or a protocol associated with the outbound signal; an antenna for transmitting the outbound signal wherein the regulatory mask is received by the programmable radio from an external source prior to determining whether a signal attribute of the outbound signal exceeds a regulatory mask;
    wherein one of the second module is further configured to one of end signal propagation or adjust the signal attribute if the signal attribute exceeds the regulatory mask.

19. The system of claim 18, wherein the second module is configured to prevent outbound signal transmission if the signal attribute exceeds the regulatory mask.

20. The system of claim 18, wherein the second module is configured to enable the outbound signal transmission if the outbound signal does not exceed the regulatory mask.

21. The system of claim 18, wherein the second module is further configured to enable transmission of the outbound signal with an attenuated signal if the single attribute exceeds the regulatory mask.

22. A computer-readable storage device containing a set of instructions to cause a computer to perform a process comprising measuring a signal attribute of an outbound signal having a first protocol; comparing the signal attribute with a regulatory mask, the regulatory mask governed by at least one of a radio location or a signal protocol; and determining whether to transmit the outbound signal; wherein the predefined mask is received by the radio from an external source prior to determining whether a signal attribute of the outbound signal exceeds a regulatory mask.

23. The computer-readable storage device of claim 22, wherein the instructions further comprises defining the regulatory mask as a function of at least one of a location and a protocol associated with the outbound signal.

24. The computer-readable storage device of claim 22, wherein determining whether to transmit the outbound signal further comprises transmitting the outbound signal if the signal attribute does not exceed the regulatory mask.

25. The computer-readable storage device of claim 22, further comprising transmitting the outbound signal with a default protocol if the signal attribute exceeds the regulatory mask.

* * * * *